UNITED STATES PATENT OFFICE.

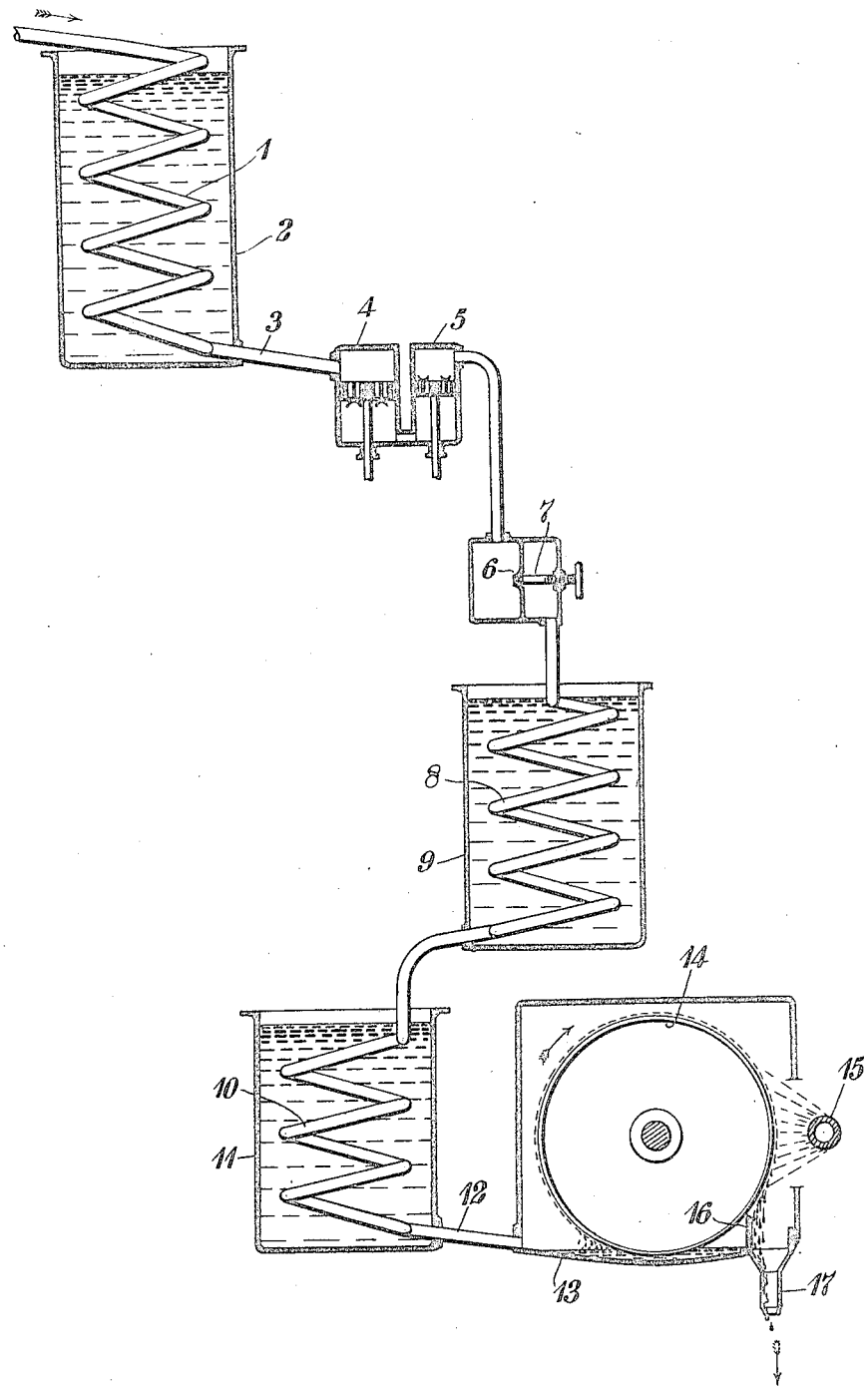

ANDRÉ HELBRONNER AND MAX VON RECKLINGHAUSEN, OF PARIS, FRANCE, ASSIGNORS, BY MESNE ASSIGNMENTS, TO THE R. U. V. COMPANY, INC., A CORPORATION OF NEW YORK.

STERILIZATION OF LIQUIDS.

1,141,056.  Specification of Letters Patent.  Patented May 25, 1915.

Application filed June 21, 1912, Serial No. 705,108.  Renewed April 22, 1915.  Serial No. 23,215.

*To all whom it may concern:*

Be it known that we, ANDRÉ HELBRONNER, a citizen of the Republic of France, and MAX VON RECKLINGHAUSEN, a subject of the Emperor of Germany, residing at Paris, France, have invented new and useful Improvements Relating to the Sterilization of Liquids, of which the following is a specification.

This invention relates to the sterilization of liquids such as milk, beer, wine and other alcoholic liquors, and has for its object to provide an improved process for this purpose.

It is known that it is possible to destroy the bacteria contained in milk by utilizing the sterilizing properties of ultra-violet rays, the milk being caused to pass in a stream sufficiently thin for its opacity not to be an obstacle to the passage of the ultra-violet rays through the mass. It has been found however that under the usual operative conditions which include the treatment of the milk at ordinary temperatures and the cooling of the sterilizing apparatus by a current of water also at ordinary temperatures, that is to say in the neighborhood of 15° C. two conditions which it is essential to observe in order to obtain a product suitable for consumption cannot be attained. These two conditions are, complete sterilization, and preservation of the composition, digestive qualities and taste. In short, microbes and molds cannot be completely eliminated from milk except by causing it to remain in the sterilizing apparatus for such a length of time as will occasion certain alterations in the milk which give it a bad taste. It is furthermore well known that it is possible to completely sterilize milk by heating it to a temperature of 100° C. to 110° C. but at this temperature a large number of the chemical constituents and diastases of the milk are altered in such a manner that the milk no longer possesses the same nutritive qualities that it had before treatment. These observations also apply to beer, wines and other alcoholic liquors.

The present invention has for its object to provide a process which avoids the above objections and permits complete sterilization to be obtained without the milk, or other liquid, altering during the treatment or acquiring a bad taste.

The improved process according to the present invention consists, primarily in combining the action of ultra-violet rays with that of heat, at the same time eliminating from both of these operations the conditions which cause their respective objectionable results, namely, as regards heating, an excessive temperature and too lengthy treatment, and as regards the ultra-violet rays an exposure to their action which is too intense and too long. The process may also include other steps which permit the action of the ultra-violet rays to be prolonged and thus rendered more complete without changing the taste of the liquid. One such step when milk is the liquid to be sterilized, consists in subjecting the milk prior to its exposure to the ultra-violet rays to a mechanical treatment known by the name of homogeneization. This treatment causes the milk to assume a new physical state in the form of a perfect and homogeneous emulsion by reason of the disaggregation of the fat globules. This homogeneity causes the action of the ultra-violet rays to be more uniform on the milk. Moreover by the reduction in size of the fat globules a stoppage of the flow when milk is caused to pass between two plates a small distance (one twentieth of a millimeter for example) apart is less likely to occur. A further important step consists in cooling the liquid at the time of its passage into the apparatus where the action of the ultra-violet rays takes place. It has been found in the case of milk for example, that for each thickness of the stream of milk passing under the action of ultra-violet rays there exists a critical output below which the milk takes an unpleasant smell by reason of the time of exposure to the rays being too prolonged and this critical output is a function of the temperature. If for example the milk is made to pass between the two quartz plates of an ultra-violet sterilizer with a thickness of $\frac{1}{10}$ of a millimeter, the exposed surface being 11 centimeters long and 3 centimeters wide, the critical output is 3.3 liters at 60° C., 2.7 liters at ordinary temperatures (18° C.), and 1.7 liters at 2° C. The quartz lamp which acted as a source of ultra-violet rays in the particular experiment under consideration was supplied with a current of 3 amperes at 150 volts. From this it appears that if the milk is exposed at a low temperature to the rays its speed can be reduced to six-tenths of that which it would have at the ordinary temperature and still no unpleasant odor is given to it. The action of the ultra-violet rays can thus be prolonged to a considerable extent without inconvenience. The complete process of sterilization in the case of milk according to this invention therefore consists preferably of four stages as follows:—1. The milk is warmed for some minutes at a temperature of between 55° C. and 60° C. 2. The milk is then caused to pass through a homogeneizing apparatus which should be maintained at the same temperature as the above in order to render the homogeneization possible and to facilitate at the same time the action of the ultra-violet rays. 3. The milk is then cooled to about 2° C. 4. The milk is then submitted at this low temperature to the action of the ultra-violet rays which completes the sterilization.

The second and third steps of the process above outlined increase greatly the efficiency of the apparatus. The cooling is not to diminish the vitality of the microbes which it does to a small extent, but is designed chiefly to permit the output to be reduced so that the milk may be exposed for a longer time to the action of the ultra-violet rays without acquiring a bad taste. The cooling may be effected in different ways. Experiment has shown that iced water is not sufficient owing to the considerable heat which is developed by the lamp employed for emitting the rays but it is necessary to employ between the lamp and the stream of milk saline solutions of common salt, chlorid of calcium or the like, cooled to 5° C. or 10° C. below 0° C. A liquefied gas, carbonic acid for example, can also be expanded in the sterilizing apparatus. A salt solution interposed between the milk and the lamp with a thickness of about 5 millimeters would only absorb a negligible quantity of ultra-violet rays even if it included about 30% of salt.

As regards the first stage, namely that of heating the milk, this should take place rapidly, the result to be aimed at consisting in producing a first attack on the microbes and molds without causing a chemical alteration of the constituents of the milk. The action on the microbes commences at a temperature of 50° C. and the higher the temperature the shorter is the time within which the sterilization commences. On the other hand at a temperature in the neighborhood of 70° C. the lacto-globulin coagulates and the lecithins decompose; these are two reactions which should be avoided and it is necessary therefore that the milk should not be permitted to rise to this temperature. The operation is therefore carried on between these two limits, preferably between 55° C. and 60° C. such a temperature being chosen that the time necessary for the action on the bacteria and spores is reduced to a minimum.

Instead of heating the milk continuously for a certain time several periods of heating of less duration, separated by intermediate periods of cooling, may be employed. For instance, instead of heating for six minutes at 60° C. three heatings each of two minutes duration at this temperature may be employed, separated by periods of cooling at ordinary temperature or to 0° C. may be employed.

The fourth stage of the process, namely that of exposure to the ultra-violet rays should be carried on preferably in the absence of air and the bacteria, already weakened by the heating operation, will be destroyed in a very short time. An apparatus in which the milk is caused to circulate in the form of a thin film such for example as that described in the French Patent 428170 dated the 6th April 1911, may be advantageously employed for this treatment.

The process of sterilizing liquids herein described combines the effects of heating and those of ultra-violet rays, retaining for each of these agents its useful properties and eliminating all the causes to which is due the want of success of either method when employed separately.

It may here be observed that one of the factors of success, the reduction to the minimum of the duration of the thermal treatment and of the exposure to the ultra-violet rays attains not only a result which is more complete both as regards sterilization properly so called, and as regards the preservation of the qualities of the liquids, but also a considerable economy in the cost of electrical energy relative to that which is entailed by sterilization by means of ultra-violet rays without heating, since in the present process the time of exposure is considerably reduced.

By the improved process there is obtained completely sterilized milk which, owing to the moderate action and short duration of the heating and of the exposure to the ultra-violet rays at low temperature, has neither lost its digestive qualities nor altered its taste. The preservation of the natural digestibility can be seen by experiment with coagulating action of lab-ferment, a certain quantity of which coagulates milk prepared according to the foregoing description, and natural milk in similar periods of time, while it requires a period 40 to 50 times as long in order to coagulate milk which has been sterilized at 100° C.

The process so far, as it comprises the combined use of heat, cold and of ultra-violet rays is applicable as hereinbefore stated, to liquids other than milk. The mechanical treatment called homogeneization can however only be used with milk or similar liquids which contain fat globules in suspension.

Apparatus for carrying out the process hereinbefore described may be of any suitable type, but in order to complete the present disclosure a simple form of apparatus will now be described which is shown diagrammatically in the accompanying drawing. In this apparatus the milk to be sterilized is led into a worm 1 inclosed in a vessel 2 containing water at a temperature of about 60° C. The milk heated to substantially this temperature passes from the worm by a pipe 3 to a homogeneizing apparatus comprising a pump here shown as consisting of a pair of cylinders 4, 5, with appropriate pistons and valves, by means of which the milk is forced through an orifice 6, the size of which can be regulated by a screw valve 7. By reason of the narrow orifice of the valve the fat globules of the heated milk are broken up so that the milk becomes homogeneized. The hot homogeneized milk is led through another worm 8 in a vessel 9 containing water at about 15° C. by which it is cooled. It is then further cooled by being led through a similar apparatus consisting of a worm 10 within a container 11, the water in which is at a temperature of 2° C. From this last worm the cooled milk is led by the pipe 12 to an apparatus for sterilizing by means of ultra-violet rays. The apparatus here shown comprises a trough 13 from which the milk is picked up by a roller 14 continuously rotated, and the thin film of milk on said roller is subjected to the influence of the ultra-violet rays emitted by a lamp 15. The sterilized milk is scraped off the roller by a scraper 16 and collected in a funnel 17 from whence it passes into a suitable receptacle.

It will be understood that no claim is made in this application for the apparatus herein described which is merely an example of the devices which can be employed for practising our improved process of sterilization.

We claim—

1. The improvement herein described, in the process of sterilizing liquids, which consists in subjecting the said liquids to a preliminary treatment by heat and then exposing them to the influence of ultra-violet rays.

2. The improvement herein described, in the process of sterilizing liquids, which consists in first subjecting the liquids to heat not sufficiently high to alter the character of the constituents thereof and thereafter exposing them to the influence of ultra-violet rays.

3. The improvement in the process of sterilizing liquids, which consists in first subjecting the liquids to a temperature not exceeding 70° C. and thereafter exposing them to the influence of ultra-violet rays.

4. The improvement in the process of sterilizing liquids, which consists in first subjecting the liquids to heat but not sufficiently high to alter the character of their constituents and thereafter exposing the same in the form of a thin film to the influence of ultra-violet rays.

5. The improvement in the process of sterilizing liquids, which consists in first subjecting the liquids to heat, but not sufficiently high to alter the character of the constituents thereof and thereafter exposing the same to the influence of ultra-violet rays with the exclusion of air.

6. The improvement in the process of sterilizing liquids, which consists in first heating the liquids to a temperature not exceeding 70° C. for a plurality of comparatively short periods of time, and thereafter exposing them to the action of ultra-violet rays.

7. The process of sterilizing milk, herein described, which consists of the following steps, heating the milk to a temperature not exceeding 70° C., subjecting it to a mechanical homogeneizing treatment, and exposing it to the influence of ultra-violet rays.

8. The process of sterilizing milk which comprises heating the milk to such a degree of temperature as will not alter the constituents thereof, mechanically treating the milk to cause disaggregation of the fat globules and finally exposing the same to the influence of ultra-violet rays.

9. The process of sterilizing milk which comprises heating the milk to a temperature not exceeding 70° C., passing the milk through an apparatus which emulsifies it by disaggregating the fat globules, and finally exposing the emulsified milk to the influence of ultra-violet rays.

10. The improvement in the process of sterilizing liquids, which consists in heating the liquids, then cooling the same and finally exposing the cooled liquids to the influence of ultra-violet rays.

11. The process of sterilizing milk which comprises heating the milk to a moderate temperature, subjecting it to a mechanical treatment for emulsifying the same, cooling the milk to a comparatively low temperature and finally subjecting it to the action of ultra-violet rays.

12. The process of sterilizing liquids, which comprises first heating the liquid to a moderate temperature, thereby obtaining a preliminary action on the bacteria and molds without appreciably modifying the properties of the liquid, and then exposing the same to the influence of ultra-violet rays, the intensity of the rays and time of exposure being so controlled with reference to each other that the destruction of the germs is caused without altering the nutritive qualities and taste of the liquid.

13. The process of sterilizing milk herein described, comprising heating the milk to a moderate degree of temperature for a short time with the object of beginning an attack on the microbes without causing any appreciable decomposition of the elements of the milk; disaggregation of the fat globules at the same temperature with the object of rendering the milk homogeneous, and thereby rendering uniform the action of the ultra-violet rays, and finally exposing the same to the influence of ultra-violet rays at a comparatively low temperature, for a period of time sufficiently short to avoid alteration of the taste.

14. The process of sterilizing milk comprising the steps of successively subjecting it to a mechanical homogeneizing treatment and to the influence of ultra-violet rays.

15. The process of sterilizing milk comprising the steps of successively subjecting it to a mechanical homogeneizing treatment, to a cooling action and to the influence of ultra-violet rays.

In testimony whereof we have hereunto subscribed our names this seventh day of June, 1912.

ANDRÉ HELBRONNER.
MAX von RECKLINGHAUSEN.

Witnesses:
L. MEMMINGER,
GEORGE E. LIGHT.